United States Patent [19]
Della Polla, Jr.

[11] Patent Number: 5,507,509
[45] Date of Patent: Apr. 16, 1996

[54] ADJUSTING BRACE PANEL CART

[76] Inventor: Michael Della Polla, Jr., P.O. Box 1170, Kennesaw, Ga. 30144

[21] Appl. No.: 157,527

[22] Filed: Nov. 26, 1993

[51] Int. Cl.⁶ .................................................. B62B 3/04
[52] U.S. Cl. .................. 280/79.7; 280/47.34; 269/17; 269/133
[58] Field of Search ................................. 280/79.7, 651, 280/657, 47.34, 47.35, 79.11, 79.3, 47.26, 47.28, 47.27, DIG. 11; 211/28, 47; 269/910, 905, 17, 133, 139, 157, 256; 414/11

[56] References Cited

U.S. PATENT DOCUMENTS

| | | | |
|---|---|---|---|
| 2,253,764 | 8/1941 | Condon | 280/79.3 |
| 2,830,632 | 4/1958 | La Rouche | 269/133 |
| 3,580,601 | 5/1971 | Miles | 280/79.7 |
| 3,698,577 | 10/1972 | Dean | 280/79.7 |
| 4,270,741 | 6/1981 | Hurst | 280/79.7 |
| 5,244,221 | 9/1993 | Ward | 280/79.7 |
| 5,299,816 | 4/1994 | Vom Braucke et al. | 280/655.1 |
| 5,318,316 | 6/1994 | Shurtleff | 280/79.7 |

FOREIGN PATENT DOCUMENTS

| | | | |
|---|---|---|---|
| 1194047 | 9/1985 | Canada | 269/133 |
| 6506234 | 1/1966 | Netherlands | 280/79.7 |
| 8502401 | 4/1987 | Netherlands | 280/79.7 |
| 0670605 | 6/1989 | Switzerland | 280/79.7 |

*Primary Examiner*—Anne Marie Boehler

[57] ABSTRACT

The invention provides a cart to carry large panels of sheet goods. It incorporates a panel bracing mechanism that automatically adjusts and locks in place different width panels. The cart consists of a wheeled frame, a handle attached to the frame, and a panel bracing mechanism. When a panel is placed in the panel bracing mechanism, the weight of the panel causes braces to shift and lock the panel in place. The cart is moved and steered by the user pushing on the back of the panel. When the panel is lifted from the cart, the weight of the panel is removed and the bracing mechanism releases the panel. Once empty, the pivoting handle is used to pull and direct the cart.

2 Claims, 3 Drawing Sheets

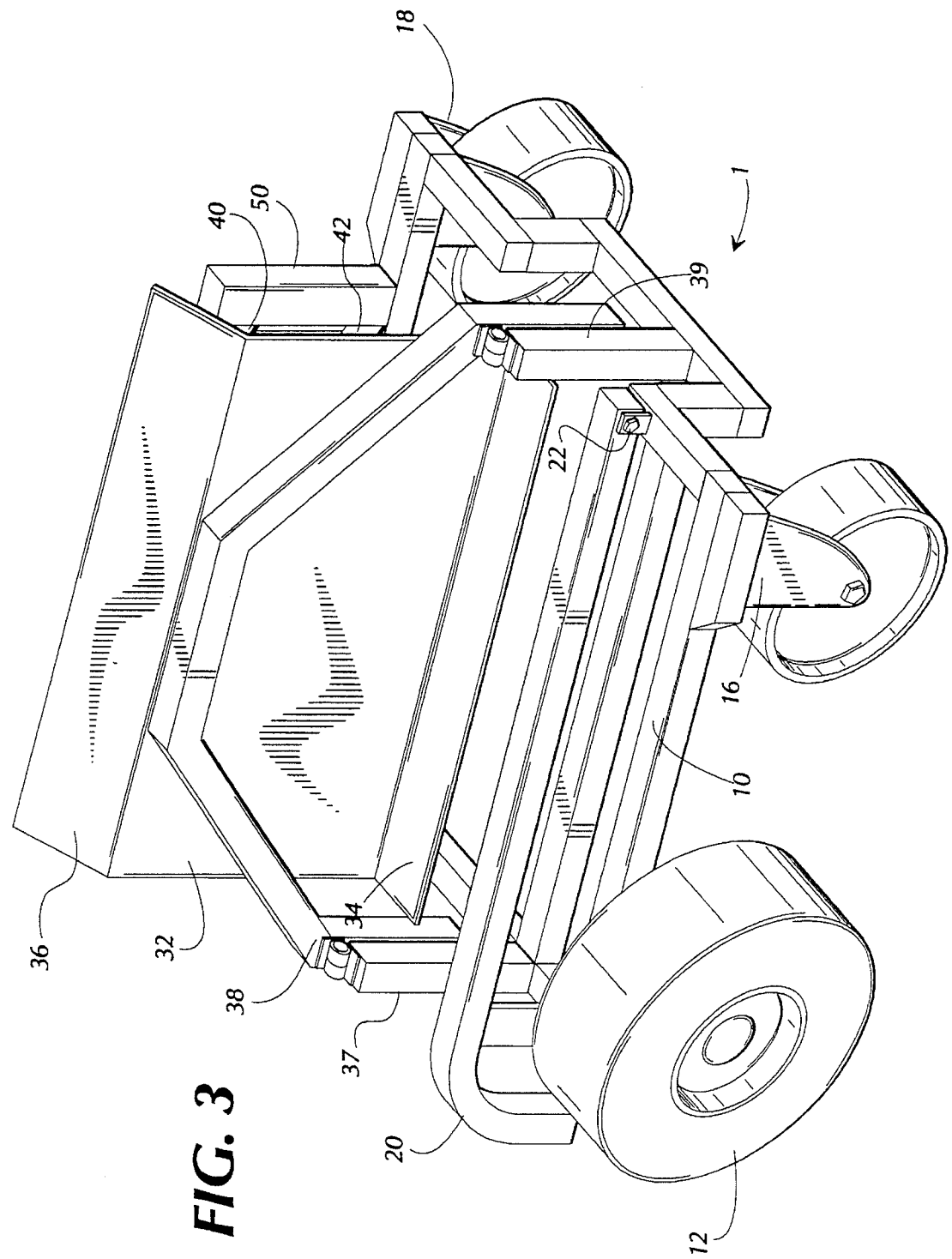

ADJUSTING BRACE PANEL CART

FIELD OF THE INVENTION

The present invention relates to a cart for carrying large panels of sheet goods that is more efficient and cost effective to the user than other panel carrying carts.

BACKGROUND

A great deal of emphasis is placed in the modern work place to make it more efficient and safer. As the need grows to do more with less, many of the old time methods and machines are being replaced with more efficient and cost effective ones.

As the cost of hardwoods continue to rise more and more shops are turning to sheet goods as a more cost efficient method of making their products. However the standard sheets of panels are of such size and weight that the rigors of moving them in the shop makes their economy less attractive.

There are carts designed to carry large panels but the size, weight and cost of these carts make their appeal limited to large shops that can justify their monetary cost and have the luxury of extra space for storage and loading. These carts are also designed to carry a multitude of sheets at once. Since only one sheet at a time is usually needed, and only one sheet can be cut at a time, the capability to carry multiple sheets can be a moot point.

Because of the cost and space lost by these large carts, many shops will move panels by hand with two men. However, this method not only doubles the man power needed compared to a cart, it increases the chances of back strain and injury. In very small shops one man could simply try to drag the panel to where it needs to go. Besides being slow and awkward, this method damages the panel and is usually interrupted by a phone call at the most inopportune time.

SUMMARY OF THE INVENTION

The object of the present invention is to provide a cart for handling large panels of sheet goods more efficiently in a shop setting. The present invention provides the following efficiencies. It reduces the manpower requirements to carry large panels of sheet goods by hand. It is loaded easier and requires less space to load than conventional panel carts. It has a small foot print and a low profile which allows it to be maneuvered easier in narrow paths and reduces the space required for storage. It easily traverses normal shop obstacles such as extension cords, air hoses and wood scraps. It incorporates a mechanism that automatically adjusts and braces different widths of large panels so the user does not have to continuously hold the panel. It costs less than conventional carriers because it uses far less materials. It reduces extra handling of panels because a panel can be unloaded directly onto a vertical panel saw, making the panel saw a truly one man operation.

The present invention consists of two major components, a wheeled frame and an attached panel bracing mechanism.

The wheeled frame consists of two large tires and two locking casters. The frame can be made out of metal, wood or other material that would provide a rigid frame for the panel brace mechanism. A handle is also attached to the frame to provide ease of movement when the panel carrier is empty.

One version of the bracing mechanism is comprised of a pair of longitudinally and vertically parallel vertical braces longitudinally attached to the frame, two pair of parallel swing arms, two fixed posts, and a pair of springs. One of the vertical braces is fixed on the frame and the opposing adjusting brace is lipped on the bottom in the direction of the fixed brace. The adjusting vertical brace also has an angled flange on the top to aid entry of panels. The fixed brace is wide enough to allow clearance of the lipped bottom of the opposing adjusting brace to go through it. Each pair of parallel swing arms are connected to the out side of the adjusting brace and to the fixed posts so they can pivot vertically. The swing arms are attached the same distance apart on the adjusting brace and fixed post so as to stay parallel at all times. The springs are connected to the top of the fixed posts and to the bottom of the adjusting brace with enough tension to keep the two braces a part.

A second version of the bracing mechanism would be similar to the first with the exception of the fixed brace. Instead of a fixed brace, a pivoting brace would be used. The top of this brace would pivot away from the adjusting brace and the bottom of the brace would pivot toward the adjusting brace. When loaded, the panel would push down on the bottom of the pivoting brace causing the brace to pivot to the vertical position. There are two advantages of this type of pivoting brace. First, the panel would not have to be pivoted quite as high to load because the top of the brace is lowered. Second, the opening of the brace mechanism would be larger making it easier to lower a panel into it.

In operation the user would pick up an end of a large panel and pivot it in between the two braces on the cart. As the panel is set down it would push down on the adjusting brace's bottom lip. The panel's weight would overcome the tension of the retracting springs and the swing arms would pivot the adjusting brace toward the fixed brace. The swing arms would keep the adjusting brace parallel longitudinally and vertically with the fixed brace to lock the panel in between them. The panel shifts the braces and is locked in the cart. The user would then move the cart by pushing on the back of the panel. The large front wheels easily glide over the usual shop obstacles on the floor pulling the smaller castering rear wheels with them. If the carrier is reversed, the castering wheels would encounter an obstacle first. In this case the user would simply push down on the back of the panel to lift the casters up and over the obstacle. The panel would be removed by lifting up on one end. This allows the retracting springs to pull the adjusting brace away from the fixed brace. The panel is then pivoted out of the cart. Once the cart is empty it can be easily maneuvered around the shop by pivoting up the handle and pulling it backwards, castering wheels first.

The operation of the cart with a pivoting fixed brace would be similar. When loaded the brace would pivot to the vertical position. When empty, the brace would pivot away from the adjusting brace making it easier to load and unload.

BRIEF DESCRIPTION OF THE DRAWINGS

FIG. 3 shows a view of a version that uses a pivoting brace instead of a fixed brace on the left side of the invention.

DETAILED DESCRIPTION

Figure 1:
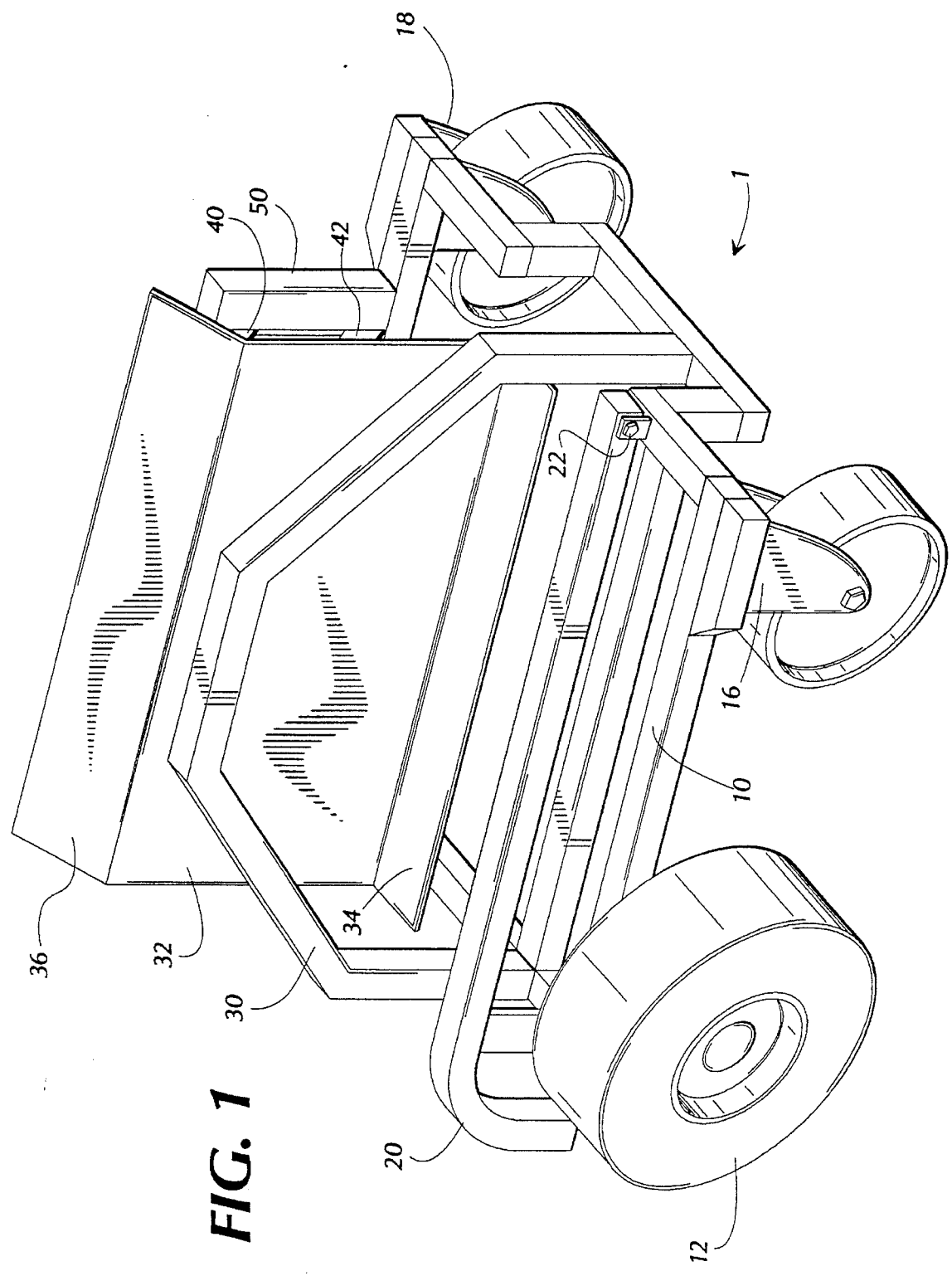
FIG. 1 shows a view of the back of the fixed brace and handle on the left side of the invention.

Referring first to FIG. 1, a panel carrying cart (1) is shown. A frame (10) has two large front wheels (12) and (14)

attached in a drop axle arrangement. Two locking casters (16) and (18) are attached to the rear of said frame (10). A pivoting handle (20) is attached to said frame by a pivoting handle attachment fixture (22) which allows the handle to pivot only longitudinally.

Attached longitudinally to said frame (10) is a fixed vertical brace (30). Running parallel vertically and longitudinally to said brace (30) is an adjusting brace (32). Running the length of the bottom of said adjusting brace (32) is a 90 degree supporting flange (34). Said 90 degree bend is in the direction of said fixed brace (30). Said fixed brace (30) is formed so there is sufficient clearance within said brace (30) for said flange (34) when said braces (30) and (32) contact. Running the length of the top of said adjusting brace (32) is an angled directing flange (36).

Figure 2:
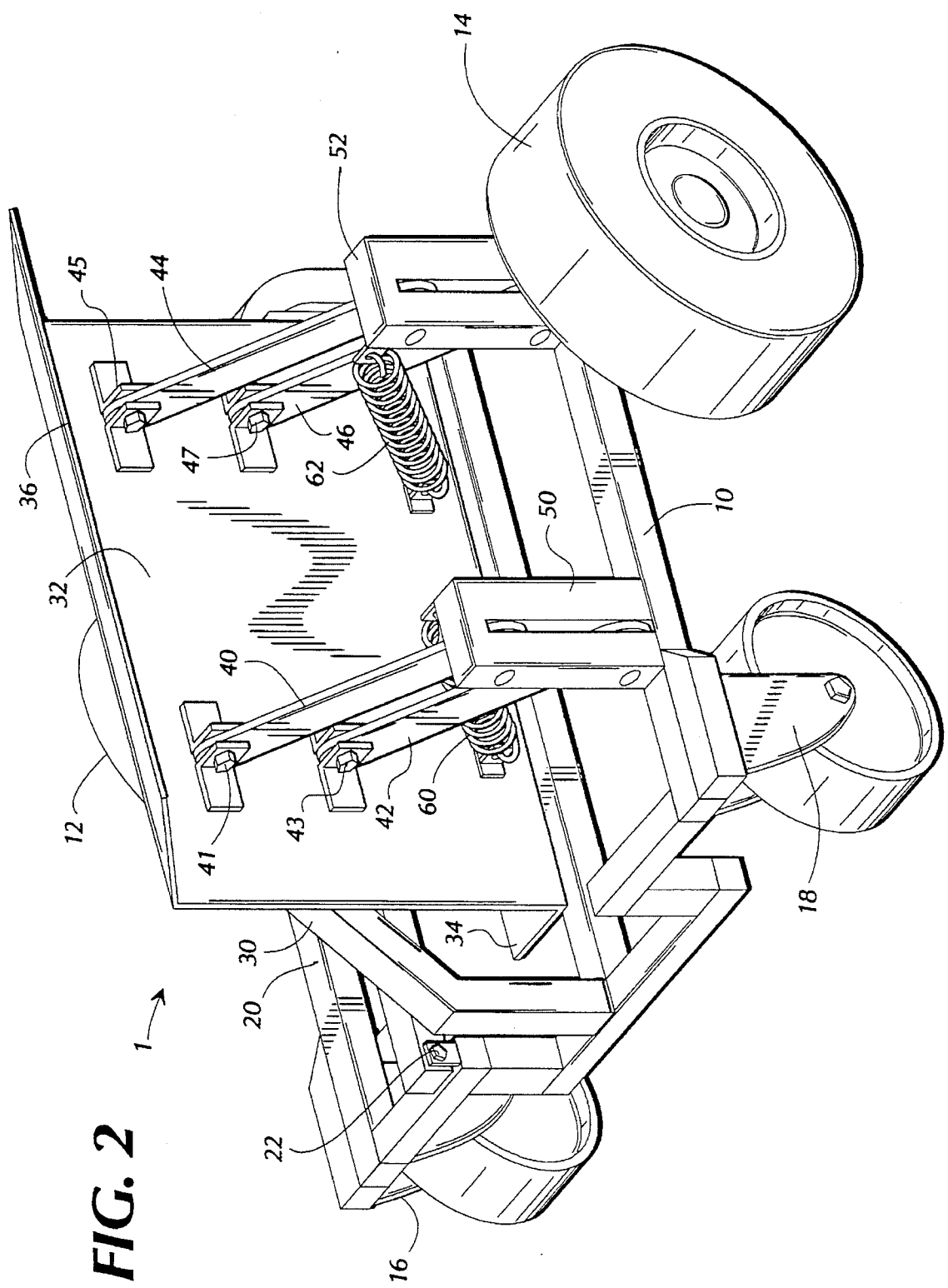
FIG. 2 shows a view of the adjusting brace on the left side of the invention.

FIG. 2. shows an adjusting mechanism used to support said adjusting brace (32). On the back of said adjusting brace (32) are four swing arm attaching fixtures (41), (43), (45) and (47). Said fixtures (41) and (43) are mirrored in location and distance apart by said fixtures (45) and (47) on the back of said adjusting brace (32). Four swing arms (40), (42), (44) and (46) are attached to said fixtures (41), (43), (45), and (47) respectively, so that each of said swing arms may only move vertically in each of said swing arm attaching fixtures.

Two fixed posts (50) and (52) are attached to said frame (10). Attached to said posts (50) and (52) are said swing arms (40), (42) and (44), (46) respectively, spaced so that the attaching points on said posts (50) and (52) are the same distance apart as the distance between said swing arm attaching fixtures (41) and (43). All of said swing arms (40), (42), (44) and (46) are attached to said posts (50) and (52) so as to allow only vertical movement. Two springs (60) and (62) are attached to the top of said posts (50) and (52) and to the bottom of said adjusting brace (32). Said springs (60) and (62) are of such size and resistance as to pull said adjusting brace (32) up and away from said fixed brace (30) but still be easily overcome by the weight of a small size panel.

FIG. 3 shows a version using a pivoting brace (38) instead of said fixed brace (30). Said pivoting brace (38) is hinged to two fixed posts (37) and (39) in such a way as to allow said pivoting brace (38) to pivot. When down, the bottom of said pivoting brace (38) extends toward said adjusting brace (32) and the top of said pivoting brace (38) extends away from said adjusting brace (32). When a panel is placed in said cart (1), said pivoting brace (38) is pushed into the vertical position by the panel.

I claim:

1. A panel cart that automatically clamps in place a panel laid in the cart and automatically releases said panel when said panel is lifted from said cart, comprising:

a wheeled frame, two opposing braces running parallel in vertical, longitudinal planes along said cart;

one of said braces having a supporting flange on its bottom edge that extends toward the opposite brace;

a series of swing arms that attach the flanged brace to said frame in a manner that allows said flanged brace to shift toward said opposing brace in a manner that keeps the flanged brace vertical at all times;

a retracting mechanism that is attached to said frame and to said flanged brace to provide enough resistance to keep said braces apart, but is overcome when an object is placed on said flanged brace;

wherein the opposing brace is hinged to the frame in a manner that allows a top portion of said opposing brace to pivot away from said flanged brace and a bottom portion of said opposing brace to pivot toward said flanged brace, the bottom portion of said opposing brace is long enough that, when an object is place between said braces, the bottom portion is pushed down, forcing the opposing brace to pivot to its vertical position.

2. A panel carrying cart, as in claim 1, employing a handle that can pivot in a longitudinal plain along said cart, from a back position, when said cart is loaded, to a forward position to maneuver said cart, when said cart is empty.

* * * * *